Patented Jan. 14, 1936

2,027,839

UNITED STATES PATENT OFFICE 2,027,839

PURIFICATION OF HYDROGEN PEROXIDE SOLUTIONS

Joseph S. Reichert, Niagara Falls, N. Y., assignor to E. I. du Pont de Nemours & Company, Inc., Wilmington, Del., a corporation of Delaware No Drawing. Application February 6, 1933, Serial No. 655,481

20 Claims. (Cl. 23—207)

This invention relates to the purification of aqueous solutions of hydrogen peroxide, and more particularly to the removal of catalytic impurities which tend to promote hydrogen peroxide decomposition from such solutions.

It has been recognized heretofore that the stability of hydrogen peroxide solutions depends in a large degree upon their purity. Certain impurities, for instance oxides or salts of heavy metals, which may be present in solution or in suspension in hydrogen peroxide solutions, act catalytically to cause peroxide decomposition. It has been proposed heretofore to remove such catalytic impurities from a hydrogen peroxide solution by precipitating stannic hydroxide therein. This may be done by adding a suitable tin salt or an alkali metal stannate to the solution, acidifying until the stannic hydroxide is precipitated, and removing the precipitate by decantation or filtration. In commercial practice, this purification method has not been heretofore entirely satisfactory. In some cases the impurities are removed to a large degree, while in others sufficient impurities remain after the treatment to render the solution unstable. Heretofore, it has not been understood why in some cases a considerable degree of purification is attained while in other cases purification is incomplete. Furthermore, for reasons heretofore not understood, precipitation of the stannic hydroxide often is not complete, resulting in a product containing tin in solution or a finely divided precipitate which is difficult to separate from the solution.

I have discovered that the ability of a stannic hydroxide precipitate to remove catalytic impurities from hydrogen peroxide solutions depends mainly upon the acidity of the solution at the time the stannic hydroxide is precipitated. It has been known heretofore that in order to precipitate the stannic hydroxide after adding a tin compound to the solution, it is necessary to acidify the solution. I have found that if the acidity is increased to a pH value of 1.4 or less, the amount of impurities removed by the precipitate is greatly decreased. However, if the acidity is adjusted to a pH value higher than 1.4, substantially all of the impurities may be removed from the solution by a single precipitation of a small amount of stannic hydroxide. It is preferable to have the acidity at the desired value corresponding to a pH of above 1.4 at the time the stannic hydroxide is precipitated. If the acidity corresponds to a pH value of 3.5 or higher, the precipitation of stannic hydroxide generally will be incomplete. I have further discovered that the maximum removal of impurities is secured by precipitating the stannic hydroxide at a pH of about 2.0 or higher.

The pH values mentioned above and hereinafter are those determined by the La Motte colorimetric pH indicator.

In some cases, however, the precipitation of the stannic hydroxide may be more or less incomplete, even though the acidity of the solution at the time of precipitation corresponds to a pH of 3.5 or less. This may be due to the presence of certain substances which tend to peptize the stannic hydroxide precipitate. I have discovered that in such cases complete precipitation of the stannic hydroxide at a pH of 3.5 or lower may be effected by adding to the solution a small amount of a soluble substance capable of furnishing polyvalent positive ions. The effectiveness of a positive polyvalent ion to complete the precipitation is in general directly proportional to its valence. For this purpose I prefer to add an aluminum compound the anion of which does not have a valence higher than 2. For example, aluminum chloride, aluminum sulfate or potassium alum may be used with good results. Small amounts, in general not more than 20 mg. per liter, of such aluminum compounds are sufficient to complete the precipitation when the tin compound concentration does not exceed 200 milligrams per liter. The aluminum compound may be added before, after or simultaneously with the addition of the tin compound.

It is understood that if other polyvalent positive ions are substituted for aluminum, they should have substantially no catalytic effect in causing hydrogen peroxide decomposition. For example, I have found barium ions to be effective.

By way of example, one method of carrying out my invention will be described. A soluble tin compound, for instance stannic chloride or sodium stannate, is added to the impure hydrogen peroxide solution in an amount equivalent to 20 to 400 milligrams of tin per liter, preferably in the form of the aqueous solution of the tin compound. If necessary, sufficient acid, for instance sulphuric acid, is then added to the solution in order to bring the acidity to the desired value, preferably to a pH in the range 2.0 to 3.5. If desired, the precipitation of the stannic hydroxide may be assisted by heating the solution to a moderate temperature, for instance up to 80° C. However, such heating is in general not of great advantage and usually may be dispensed with. After precipitation is complete, the precipitate may be removed by decantation or filtration and, if desired, the stability of the purified solution may be further increased by adding a stabilizer.

Another method of carrying out my invention comprises acidifying the solution and then adding sodium stannate or other soluble tin compound to precipitate stannic hydroxide. When employing this procedure, the soluble tin compound should be added in such amounts that the pH will thereby be increased to more than 1.4 and preferably to within the range 2.0 to 3.5. For example, the acidity of the solution may be adjusted to a pH of 1.7 to 2.5 and sufficient of a sodium stannate solution added to bring the pH to between 2.0 and 3.5.

My invention may be further illustrated by the following examples:

*Example I*

A number of samples of 100-volume hydrogen peroxide solutions were prepared having varying measured acidities from a pH of 2.2 to a pH of less than 1.2. A solution of sodium stannate equivalent to 0.557 gms. of sodium stannate per liter of the hydrogen peroxide solution was added to each sample. In each case the precipitate formed settled rapidly. After settling, the clear solution was decanted from each sample, its acidity was measured and a test was made of its stability. The stability test consisted in holding the sample at a constant temperature of 32° C. and measuring the rate of oxygen evolution. From the stability test data, the loss in volume concentration for a period of thirty days was calculated and this result used as an expression of the stability of the solution. The results obtained are given in the following table:

| Sample | pH before addition of stannate | pH after addition of stannate | Stability (loss in volume[1] concentration in 30 days) |
|---|---|---|---|
|  |  |  | *Volumes* |
| 1 | Less than 1.2 | Less than 1.2 | 5.52 |
| 2 | Less than 1.2 | Less than 1.2 | 5.24 |
| 3 | 1.2 | 1.4 | 5.68 |
| 4 | 1.7 | 2.0 | 0.66 |
| 5 | 1.8 | 2.1 | 0.20 |
| 6 | 2.0 | 2.5 | 0.14 |
| 7 | 2.1 | 2.6 | 0.12 |
| 8 | 2.2 | 3.8 | 0.08 |

[1] The term "volume concentration" refers to the usual method of expressing the strength of hydrogen peroxide solutions; i. e. a "100-volume" solution contains approximately 30% by weight of hydrogen peroxide.

The results obtained in the above example illustrate the radical change in the ability of the stannic hydroxide precipitate to remove catalytic impurities when the acidity at the time of precipitation is increased beyond a pH of 1.4. Furthermore, as illustrated by this example, I have found that the ability of the stannic hydroxide precipitate to remove impurities is in general inversely proportional to the acidity over the pH range of 1.4 to 3.5. Because of this fact it is preferable to precipitate the stannic hydroxide at a pH which is closer to 3.5 than to a pH of 1.4; for instance, I prefer to precipitate the stannic hydroxide at a pH of between 2.0 and 3.5. Since the precipitation of the stannic hydroxide tends to be incomplete at a pH above 3.5, I prefer not to exceed this limiting value. However, as shown by the above example, a solution of high stability results when the stannic hydroxide is precipitated at a pH above 3.5. Hence precipitation at a pH above 3.5 may be desirable, where incomplete precipitation is not a disadvantage, i. e., if there is no objection to a small amount of tin compound in solution or in suspension.

The following example illustrates the effect of polyvalent positive ions in effecting complete precipitation of the stannic hydroxide.

*Example II*

To 7.4 liters of an impure 100-volume hydrogen peroxide solution having a pH of 3.0 was added an amount of sodium stannate equivalent to 200 milligrams of tin per liter of $H_2O_2$ solution. The solution then was acidified by adding 1.8 cc. of 50% sulfuric acid solution. A dense turbidity resulted, but substantially no precipitate settled out. An amount of a solution of aluminum sulfate equivalent to 8 milligrams of aluminum per liter of the peroxide solution then was added. The stannic hydroxide immediately formed a flocculent precipitate which settled rapidly. The supernatant solution was perfectly clear and had a pH of about 2.7.

The amount of positive polyvalent ion required to complete the precipitation will vary, depending upon the amounts of impurities present which act to prevent coagulation of the stannic hydroxide. For instance, in Example I, complete precipitation was effected without the addition of any aluminum salt. In any case, the need for aluminum salt and the amount required if needed, may be readily determined by testing a small sample. In general, the amount required is very small, i. e. the maximum will be less than the amount of tin employed.

After my discovery, it is obvious that heretofore stannic hydroxide precipitation in some cases effected a good purification, and in others did not because the crude hydrogen peroxide often had a different acidity in different batches and in some cases the acidity was such that the stannic hydroxide precipitation was actually carried out at a pH of less than 2.0. My invention makes possible a close control of the degree of purification attained by stannic hydroxide precipitation, so that the best possible purification may be secured in each batch of product treated. This insures the production of a more stable and more uniform product than has been heretofore possible in commercial practice. A further advantage of my invention is that it provides for complete precipitation and coagulation of the stannic hydroxide, insuring the production of a clear solution.

The term "non-catalytic polyvalent positive ion" in the appended claims will be understood to mean ions which do not have substantial catalytic action in causing hydrogen peroxide decomposition.

I claim:

1. A process for the purification of a hydrogen peroxide solution comprising precipitating stannic hydroxide therein at a pH above 1.4.

2. A process for the purification of a hydrogen peroxide solution comprising precipitating stannic hydroxide therein at a pH above 1.4 and thereafter removing the precipitated stannic hydroxide from said solution.

3. A process for the purification of a hydrogen peroxide solution comprising precipitating stannic hydroxide therein at a pH above 1.4 and not above 3.5.

4. A process for the purification of a hydrogen peroxide solution comprising precipitating stannic hydroxide therein at a pH of 2.0 to 3.5 and thereafter removing the precipitated stannic hydroxide from said solution.

5. A process for the purification of a hydrogen peroxide solution comprising precipitating stannic hydroxide therein at a pH above 1.4 in the presence of a substance capable of coagulating the stannic hydroxide precipitate.

6. A process for the purification of a hydrogen peroxide solution comprising precipitating stannic hydroxide therein at a pH of 2.0 to 3.5 in the presence of a substance capable of coagulating the stannic hydroxide precipitate.

7. A process for the purification of a hydrogen peroxide solution comprising precipitating stannic hydroxide therein at a pH of 2.0 to 3.5 in the presence of aluminum ions in an amount sufficient to coagulate the precipitate and thereafter removing precipitated stannic hydroxide from the solution.

8. A process for the purification of a hydrogen peroxide solution comprising adjusting the acidity of said solution to a pH of less than 3.5, adding a sufficient quantity of a soluble tin compound to reduce the acidity of the solution to a pH of 2.0 to 3.5 whereby stannic hydroxide is precipitated and thereafter removing precipitated stannic hydroxide from the solution.

9. A process for the purification of a hydrogen peroxide solution comprising adjusting the acidity of said solution to a pH of less than 3.5, adding a sufficient quantity of alkali metal stannate to reduce the acidity of the solution to a pH of 2.0 to 3.5 whereby stannic hydroxide is precipitated and thereafter removing precipitated stannic hydroxide from the solution.

10. A process for the purification of a hydrogen peroxide solution comprising adjusting the acidity of said solution to a pH of less than 3.5, adding a sufficient quantity of sodium stannate to reduce the acidity of the solution to a pH of 2.0 to 3.5 whereby stannic hydroxide is precipitated and thereafter removing precipitated stannic hydroxide from the solution.

11. A process for the purification of a hydrogen peroxide solution comprising adjusting the acidity of said solution to a pH of 1.7 to 3.5, adding a sufficient quantity of sodium stannate to reduce the acidity of the solution to a pH of 2.0 to 3.5 whereby stannic hydroxide is precipitated and thereafter removing precipitated stannic hydroxide from the solution.

12. A process for the purification of a hydrogen peroxide solution comprising adjusting the acidity of said solution to a pH of less than 3.5, adding a sufficient quantity of a soluble tin compound to reduce the acidity of the solution to a pH of not less than 2.0 whereby stannic hydroxide is precipitated and a sufficient amount of a soluble compound of a non-catalytic polyvalent metal to coagulate said stannic hydroxide precipitate and thereafter removing precipitated stannic hydroxide from the solution.

13. A process for the purification of a hydrogen peroxide solution comprising adjusting the acidity of said solution to a pH of less than 3.5, adding a sufficient quantity of sodium stannate to reduce the acidity of the solution to a pH of 2.0 to 3.5 whereby stannic hydroxide is precipitated and a sufficient amount of a soluble aluminum salt to coagulate said stannic hydroxide precipitate and thereafter removing precipitated stannic hydroxide from the solution.

14. A process for the purification of a hydrogen peroxide solution comprising precipitating stannic hydroxide therein at a pH of 2.0 to 3.5 in the presence of a sufficient quantity of aluminum sulfate to coagulate said stannic hydroxide precipitate and thereafter removing precipitated stannic hydroxide from the solution.

15. A process for the purification of a hydrogen peroxide solution comprising adding to said solution a soluble tin compound, adjusting the acidity of the solution to a pH of 2.0 to 3.5 whereby stannic hydroxide is precipitated, and thereafter removing the precipitated stannic hydroxide from the solution.

16. A process for the purification of a hydrogen peroxide solution comprising adding to said solution an amount of sodium stannate equivalent to 20–400 milligrams of tin per liter, adjusting the acidity of the solution to a pH of 2.0 to 3.5 whereby stannic hydroxide is precipitated and thereafter removing precipitated stannic hydroxide from the solution.

17. A process for the purification of a hydrogen peroxide solution comprisng adding to said solution an amount of sodium stannate equivalent to 20–400 milligrams of tin per liter, adjusting the acidity of the solution to a pH of 2.0 to 3.5 whereby stannic hydroxide is precipitated, adding to said solution a sufficient quantity of aluminum sulfate to coagulate said stannic hydroxide precipitate and thereafter removing precipitated stannic hydroxide from the solution.

18. A process for the purification of a hydrogen peroxide solution comprising adding to said solution sodium stannate, adjusting the acidity of the solution to a pH of 2.0 to 3.5 whereby stannic hydroxide is precipitated, adding to said solution an aluminum salt in amount sufficient to effect substantially complete coagulation of the stannic hydroxide, and thereafter removing precipitated stannic hydroxide from the solution.

19. A process for the purification of a hydrogen peroxide solution comprising adding to said solution sodium stannate, adjusting the acidity of the solution to a pH of 2.0 to 3.5 whereby stannic hydroxide is precipitated, adding to said solution aluminum sulfate in amount sufficient to effect substantially complete coagulation of the stannic hydroxide, and thereafter removing precipitated stannic hydroxide from the solution.

20. A process for the purification of a hydrogen peroxide solution comprising adding to said solution sodium stannate, adjusting the acidity of the solution to a pH of 2.0 to 3.5 whereby stannic hydroxide is precipitated, adding to said solution potassium alum in amount sufficient to effect substantially complete coagulation of the stannic hydroxide, and thereafter removing precipitated stannic hydroxide from the solution.

JOSEPH S. REICHERT.